(12) United States Patent
Sharples et al.

(10) Patent No.: US 8,373,299 B2
(45) Date of Patent: Feb. 12, 2013

(54) AXIAL GAP ROTATING ELECTRICAL MACHINE

(75) Inventors: William G. Sharples, San Francisco, CA (US); Patrick J. McCleer, Jackson, MI (US)

(73) Assignee: Clear Path Energy, LLC, Wilmington, DE (US)

( * ) Notice: Subject to any disclaimer, the term of this patent is extended or adjusted under 35 U.S.C. 154(b) by 62 days.

(21) Appl. No.: 12/968,670

(22) Filed: Dec. 15, 2010

(65) Prior Publication Data

US 2011/0140451 A1 Jun. 16, 2011

Related U.S. Application Data

(60) Provisional application No. 61/287,157, filed on Dec. 16, 2009, provisional application No. 61/314,146, filed on Mar. 15, 2010.

(51) Int. Cl.
H02K 5/173 (2006.01)
(52) U.S. Cl. ............................... 290/55; 290/44; 310/90
(58) Field of Classification Search .................... 310/90; 290/44, 55
See application file for complete search history.

(56) References Cited

U.S. PATENT DOCUMENTS

| | | | |
|---|---|---|---|
| 2,177,801 A | 10/1939 | Erren | |
| 3,789,252 A | 1/1974 | Abegg | |
| 4,449,889 A | 5/1984 | Belden | |
| 5,057,726 A | 10/1991 | Mole | |
| RE34,268 E * | 6/1993 | Muller | 310/67 R |
| 5,315,159 A * | 5/1994 | Gribnau | 290/55 |
| 5,599,168 A | 2/1997 | Lund | |
| 6,064,123 A | 5/2000 | Gislason | |
| 6,177,735 B1 | 1/2001 | Chapman | |
| 6,492,756 B1 | 12/2002 | Maslov | |
| 6,664,655 B2 | 12/2003 | Vann | |
| 6,727,600 B1 | 4/2004 | Abdurachmanov | |
| 6,759,758 B2 | 7/2004 | Torres Martinez | |
| 6,791,222 B1 | 9/2004 | Maslov | |
| 6,836,028 B2 * | 12/2004 | Northrup et al. | 290/44 |
| 7,042,109 B2 | 5/2006 | Gabrys | |
| 7,075,189 B2 | 7/2006 | Heronemus | |
| 7,119,453 B2 * | 10/2006 | Bywaters et al. | 290/55 |
| 7,154,191 B2 | 12/2006 | Jansen | |
| 7,156,037 B2 | 1/2007 | Borgen | |
| 7,156,586 B2 | 1/2007 | Nim | |
| 7,180,204 B2 | 2/2007 | Grant | |
| 7,183,665 B2 | 2/2007 | Bywaters | |

(Continued)

FOREIGN PATENT DOCUMENTS

| | | |
|---|---|---|
| JP | 2008-099344 A | 4/2008 |
| WO | 2009016372 | 2/2009 |

OTHER PUBLICATIONS

International Search Report and Written Opinion of the ISA for PCT/US2010/060614, filed Dec. 15, 2010.

(Continued)

*Primary Examiner* — Hanh Nguyen
*Assistant Examiner* — Naishadh Desai
(74) *Attorney, Agent, or Firm* — PatentBest; Andrew McAleavey

(57) ABSTRACT

Direct drive rotating electrical machines with axial air gaps are disclosed. In these machines, a rotor ring and stator ring define an axial air gap between them. Sets of gap-maintaining rolling supports bear between the rotor ring and the stator ring at their peripheries to maintain the axial air gap. Also disclosed are wind turbines using these generators, and structures and methods for mounting direct drive rotating electrical generators to the hubs of wind turbines. In particular, the rotor ring of the generator may be carried directly by the hub of a wind turbine to rotate relative to a shaft without being mounted directly to the shaft.

24 Claims, 9 Drawing Sheets

U.S. PATENT DOCUMENTS

| | | | |
|---|---|---|---|
| 7,186,083 B2 * | 3/2007 | Bayly | 416/51 |
| 7,202,584 B2 | 4/2007 | Ida | |
| 7,204,673 B2 | 4/2007 | Wobben | |
| 7,293,060 B2 | 11/2007 | Komsi | |
| 7,315,102 B2 | 1/2008 | Minagawa | |
| 7,355,309 B2 | 4/2008 | Costin | |
| 7,456,515 B2 | 11/2008 | Nielsen | |
| 7,456,534 B2 * | 11/2008 | Engstrom | 310/75 C |
| 7,482,720 B2 | 1/2009 | Gordon | |
| 7,579,744 B2 | 8/2009 | Kato | |
| 7,612,462 B2 | 11/2009 | Viterna | |
| 7,646,132 B2 | 1/2010 | Halstead | |
| 7,687,932 B2 | 3/2010 | Casazza | |
| 7,709,971 B2 | 5/2010 | Sane | |
| 7,944,074 B2 * | 5/2011 | Longtin et al. | 290/55 |
| 2004/0041409 A1 * | 3/2004 | Gabrys | 290/55 |
| 2004/0169376 A1 | 9/2004 | Ruer | |
| 2005/0155346 A1 | 7/2005 | Nikolaus | |
| 2006/0062676 A1 | 3/2006 | Jakubowski | |
| 2006/0071575 A1 * | 4/2006 | Jansen et al. | 310/266 |
| 2006/0158055 A1 * | 7/2006 | Ivtsenkov | 310/156.01 |
| 2006/0269362 A1 | 11/2006 | Henriksen | |
| 2007/0036657 A1 | 2/2007 | Wobben | |
| 2007/0075548 A1 * | 4/2007 | Bagepalli et al. | 290/55 |
| 2007/0200349 A1 * | 8/2007 | Bacon | 290/44 |
| 2007/0207028 A1 | 9/2007 | Nicholas | |
| 2007/0214632 A1 | 9/2007 | Kojima | |
| 2008/0012346 A1 * | 1/2008 | Bertolotti | 290/55 |
| 2008/0161189 A1 * | 7/2008 | Lewis et al. | 505/121 |
| 2008/0199309 A1 * | 8/2008 | Bagepalli et al. | 415/170.1 |
| 2008/0272602 A1 * | 11/2008 | Kim et al. | 290/55 |
| 2009/0243301 A1 * | 10/2009 | Longtin et al. | 290/55 |
| 2010/0133838 A1 | 6/2010 | Borgen | |

OTHER PUBLICATIONS

"The Most Amazing Windmills in the World," Internet. Available at http://www.mywindpowersystem.com/2009/05/the-most-amazing-wind-turbines-designs/. May, 2009. Last visited Oct. 6, 2010.

"History: MOD-2/MOD-5B Wind Turbines," Internet. Available at http://www.boeing.com/history/boeing/windturbine.html. Last visited Dec. 14, 2010.

* cited by examiner

AXIAL GAP ROTATING ELECTRICAL MACHINE

CROSS-REFERENCE TO RELATED APPLICATIONS

This patent application claims priority to U.S. Provisional Patent Application No. 61/287,157, filed Dec. 16, 2009, and to U.S. Provisional Patent Application No. 61/314,146, filed Mar. 15, 2010. The contents of both of those applications are hereby incorporated by reference in their entireties.

BACKGROUND OF THE INVENTION

1. Field of the Invention

The invention relates generally to rotating electrical machines, such as motors and generators, and more particularly to direct drive generators with axial air gaps.

2. Description of Related Art

In a typical electrical generator, a rotor with an array of magnetic elements, such as permanent magnets, is driven by a mechanical force to rotate in close proximity to a stationary stator, which carries metallic windings. An air gap is maintained between the magnetic elements of the rotor and the windings of the stator. Typically, the mechanical force used to turn the rotor is supplied by a rotating input shaft, and a gearbox is coupled between the input shaft and the shaft on which the rotor is mounted in order to increase the angular velocity of the rotor shaft as compared with the input shaft.

Electrical generators are used in a variety of contexts, including wind turbines. In a wind turbine, wind provides the mechanical force to drive an electrical generator. In a typical case, the wind drives a set of blades, which cause a hub to rotate an axle. The axle acts as the input shaft for the generator. The generator is generally coupled to the axle through a gearbox.

More recently, so-called "direct drive" generators have shown promise in use with wind turbines. In a direct drive generator, there is no gearbox; the generator rotor turns or rotates at the same rate as the blades and hub. Because a direct drive generator does not use a gearbox, it is typically much larger than a traditional generator, so that it can generate adequate electricity at the slower speed of rotation. Direct drive generator diameters of greater than 3 meters are common in wind turbine applications with a power rating above 2 Megawatts (MW).

In a typical direct drive generator, such as that disclosed in U.S. Pat. No. 7,456,534 to Engstrom, the air gap between the rotor and the stator is a radial air gap—i.e., the gap between the rotor and the stator lies along the radial edge of the rotor, and the stator faces the radial edge of the rotor on the other side of the air gap. In such direct drive generators, one of the main problems is maintaining a uniform air gap. The dimensions of the typical direct drive generator make that difficult—the diameter of the rotor may be 2 meters or more, but the air gap is usually on the order of 5 to 10 millimeters.

SUMMARY OF THE INVENTION

One aspect of the invention pertains to a rotating electrical machine. In the rotating electrical machine, a rotatable rotor ring and a stator ring are placed in proximity to one another in association with a shaft. An axial air gap is defined between the rotor ring and the stator ring. One or more sets of rolling gap supports bear between the rotor ring and the stator ring along the periphery of the rotor ring and the stator ring in the direction of the axial air gap so as to maintain the axial air gap. Depending on the particular embodiment, the sets of rolling gap supports may be positioned radially outward of the axial air gap, radially inward of the axial air gap, or both. The rotor ring may be mounted for rotation on the shaft.

However, another aspect of the invention pertains to assemblies in which the rotor ring is not directly connected to the shaft. In these assemblies, a hub, which may have one or more wind-driven blades, is mounted to the shaft. The rotor ring is carried by the hub for rotation in association with the shaft and in proximity to a stator ring. In some embodiments, the rotor ring and the stator ring may form an axial air gap therebetween, and one or more sets of rolling gap supports may bear between the rotor ring and the stator ring along the periphery of the rotor ring and the stator ring in the direction of the axial air gap so as to maintain the axial air gap.

Yet other aspects of the invention relate to generators with multiple air gaps. In these aspects of the invention, a rotor ring has a peripheral channel with at least left and right sidewalls. Interior faces of the left and right sidewalls carry respective first and second sets of magnetic elements. A stator ring has a peripheral portion that is sized and adapted to be at least partially received in the peripheral channel of the rotor ring between the left and right sidewalls. The peripheral portion of the stator ring has left and right faces with respective first and second sets of stator teeth. Each of the stator teeth has windings or coils. The rotor ring is constructed and arranged to rotate relative to the stator ring, and the positioning of the stator ring and the rotor ring establishes first and second axial air gaps between the sets of magnetic elements and stator teeth. One or more sets of rolling gap supports bear between the peripheral channel of the rotor ring and the peripheral portion of the stator ring so as to maintain the first and second axial air gaps.

Other aspects, features, and advantages of the invention will be set forth in the description that follows.

BRIEF DESCRIPTION OF THE DRAWING FIGURES

The invention will be described with respect to the following drawing figures, in which like numerals represent like features throughout the views, and in which.

DETAILED DESCRIPTION

Figure 1:
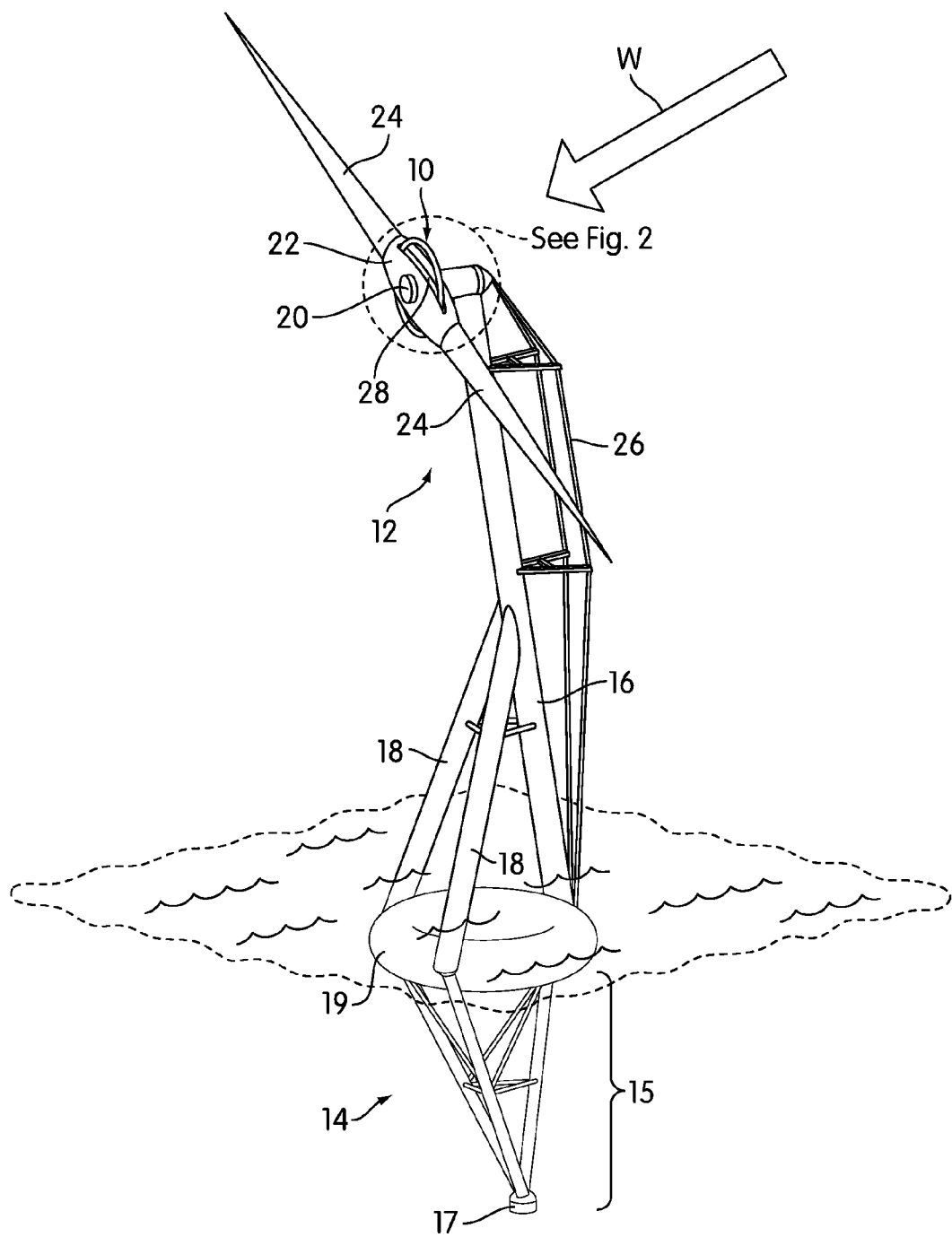
FIG. 1 is a perspective view of a wind turbine employing an axial gap direct drive generator according to one embodiment of the invention.

FIG. 1 is a perspective view of a direct drive generator, generally indicated at 10, according to one embodiment of the invention, shown as installed in a wind turbine 12. Although the direct drive generator 10 is illustrated as being installed in a wind turbine 12, as those of skill in the art will realize, direct drive generators 10 according to embodiments of the invention may be used in other contexts and as parts of other types of systems. However, wind turbines 12 may be configured and adapted to function synergistically with direct drive generators 10 according to embodiments of the invention. For that reason, a description of certain features of the wind turbine 12 is provided.

The wind turbine 12 of FIG. 1 is installed on a floating underwater support structure 14, although the wind turbine 12 may be installed on any type of land- or sea-based structure. The particular details of the illustrated floating underwater support structure 14 are disclosed in the commonly-assigned, co-pending U.S. patent application of William G. Sharples, et al., entitled "Floating Underwater Support Structure," the contents of which are incorporated by reference herein in their entirety.

Briefly, the floating underwater support structure 14 of FIG. 1 comprises a truss structure 15 in the shape of an inverted pyramid or frustum that can sustain tensile and compressive loads and bending moments. The bottom of the truss structure 15 is connected to a joint 17 that allows pitch, roll, and yaw rotation. At the top of the truss structure 15, typically a few meters below the level of the water, a buoyant member 19 provides a buoyant force that is at least equal to the weight of the floating underwater support structure 14 and any structure, such as the wind turbine 12, that is mounted on it. As is described in the above-mentioned patent application, the floating underwater support structure 14 is particularly suited for structures that need to remain upright or substantially upright in water, but that can tolerate some degree of acceleration and changes in angular position. For reasons that will be explained below in more detail, although the generator 10 may be used in essentially any application, there are certain advantages to using it with the underwater support structure 14.

The wind turbine 12 has a primary support member or tower 16 and two secondary support members 18 that join the primary support member 16 at approximately its halfway point. At its top, the primary support member 16 supports an axle 20, on which a hub 22 is mounted for rotation. Two blades 24 extend from the hub 22, although a wind turbine 12 may have any number of blades. The blades 24 may be mounted to the hub 22 using pitch bearings, which would allow the wind turbine 12 to change the angle of attack of its blades 24. Other conventional techniques for controlling the angle of attack, shape, and other characteristics of the blades 24 may be used in order to control the manner in which the wind turbine 12 governs the amount of power generated. For example, the wind turbine 12 may use stall control, in which the blades 24 are shaped such that at extremely high speeds, the shape of the blades 24 causes them to stall and moderate the power generated. Alternatively, the blades 24 may include control surfaces that extend, retract, and actively change the shape of the blades 24 in order to control their speed and power output.

In operation, wind loads on the blades 24 will create an axial thrust force on the axle 20, which is transmitted through the axle 20 to induce a bending moment on the primary support member 16. Therefore, a set of tension cable supports 26 provide additional support to the primary support member 16 by counteracting those bending moments.

Figure 2:
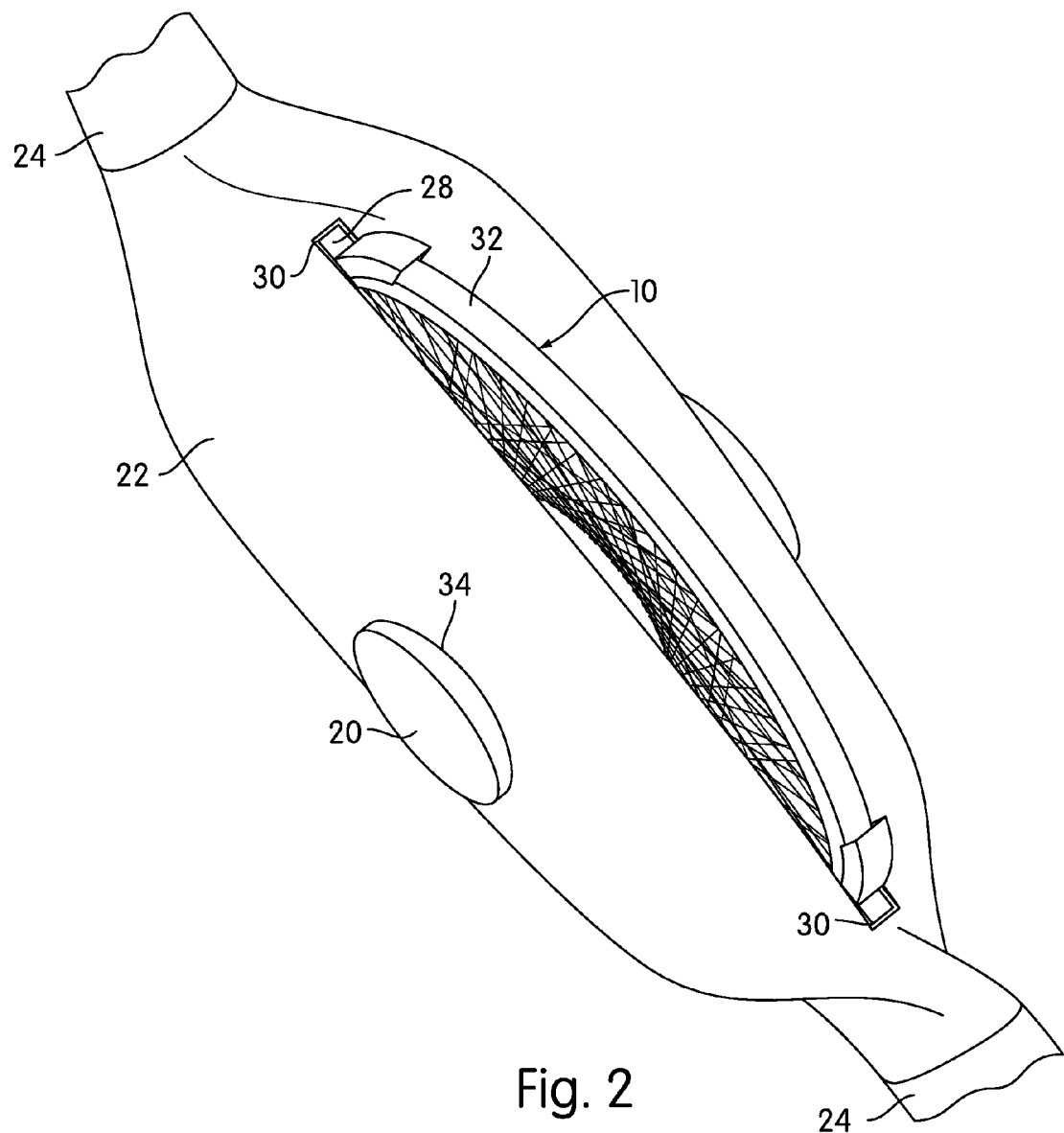
FIG. 2 is an enlarged perspective view of the axial gap direct drive generator of FIG. 1 as installed in the hub of the wind turbine.

As can be seen in FIG. 1, the direct drive generator 10 is directly integrated into the hub 22. FIG. 2 is an enlarged perspective view of the direct drive generator 10 and the hub 22 in isolation. In the illustrated embodiment, the direct drive generator 10 is carried within an elongate slot or opening 28 in the hub 22, although it may be attached to the hub 22 in other ways.

The hub 22 itself may be made of a metal, such as steel or aluminum; a composite material, such as a glass fiber or carbon fiber composite; or any other suitable material. In some embodiments, parts of the hub 22 may be made of different materials, for example, with one part of the hub made of a metal while another is made of a composite. Moreover, as shown in FIG. 2, the hub 22 is fully symmetrical front-to-back. However, in other embodiments, the hub 22 may not be symmetrical. Instead, the front of the hub 22 may be thinner than the rear, or the rear may be thinner than the front, depending on the anticipated loads and other conventional factors. In other embodiments, it may be advantageous to construct the hub 22 and blades 24 as a single piece, as a single-piece hub and blades combination may be lighter than a comparable hub 22 and blades 24 made in multiple pieces. In this case some form of control other than pitch control would need to be utilized to control the power.

The direct drive generator 10 may be mounted to the hub 22 in a number of ways. As was noted briefly above, in the embodiment illustrated in FIG. 2, the hub 22 has a large, central longitudinal opening 28. Channels 30 are secured at the top and bottom of the longitudinal central opening 28. The rotor 32 of the direct drive generator 10 is mounted to the hub 22 via the channels 30. The hub 22 also has a round axial opening 34 through which the axle 20 passes, thereby mounting the hub 22 on the axle 20. Conventional bearings, not shown in FIG. 2, would generally be used between the hub 22 and the axle 20 to facilitate rotation.

Figure 3:
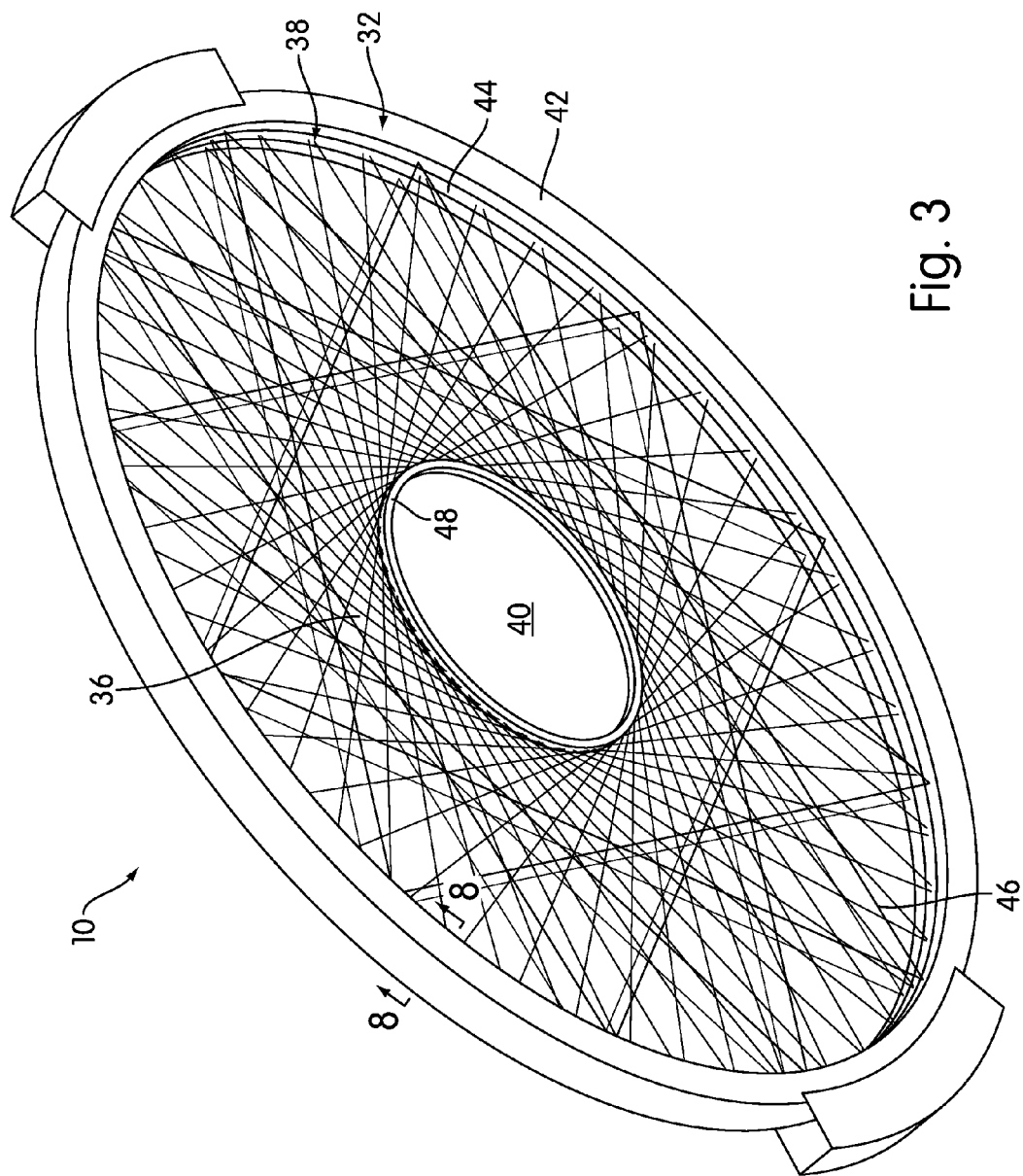
FIG. 3 is a perspective view of the axial gap direct drive generator of FIG. 1 in isolation, illustrating its open, spoked configuration.

FIG. 3 is a perspective view of the generator 10 in isolation. The rotor 32 is generally circular in overall shape and includes its own central opening 36 to allow it to fit over the axle 20. In the illustrated embodiment, the rotor 32 is carried entirely by the hub 22, and thus, it need not bear on or against or be directly connected to the axle 20. For that reason, the central opening 36 of the rotor 32 need not be round and need not be particularly shaped to fit over the axle 20. However, in other embodiments, the rotor may be mounted to the axle 20, or to any conventional shaft, by a conventional bearing. In those cases, the central opening 36 of the rotor 32 would be sized and shaped for the shaft on which it is mounted.

The stator 38 of the direct drive generator 10 also has a central opening 40 through which the axle 20 passes, mounting the stator 38 fixedly on the axle 20. In the embodiment illustrated in FIGS. 1-3, neither the rotor 32 nor the stator 38 bears heavy loads in the radial direction. Therefore, both the rotor 32 and the stator 38 have an open, spoked configuration in which the circular perimeter 42 of the rotor 32 and the corresponding circular perimeter 44 of the stator 38, when assembled, are solid, contiguous metal channels or shapes, as will be described below, and a number of spokes 46 extend through the middle of the rotor 32 and stator 38 to support the perimeters or peripheral portions 42, 44. (The rotor 32 and stator 38 may be made in segments that are assembled prior to installation.) Thus, the peripheral portion 42 of the rotor 32 and the peripheral portion 44 of the stator 38 are configured as a rotor ring and a stator ring, respectively.

In the case of the rotor 32, the spokes 46 are arranged in the general shape of a six-pointed star; they extend from one part of the rotor's periphery or perimeter 42 to another without crossing through its center, leaving an opening 36 of sufficient dimension for the axle 20 to pass through. In the case of the stator 38, the spokes 46 connect the perimeter 44 with a central ring 48 that mounts the stator 38 on the axle 20. Of course, in some embodiments, the rotor 32 may also have a central ring to which the spokes 46 connect, and its spokes may be arranged in the same way as those of the stator 38.

It should be understood that as used herein, the term "radial" refers to a direction along the radius or diameter of the rotor 32 or stator 38. The term "axial" refers to a direction orthogonal to the radial direction along the axis of rotation.

Figure 4:
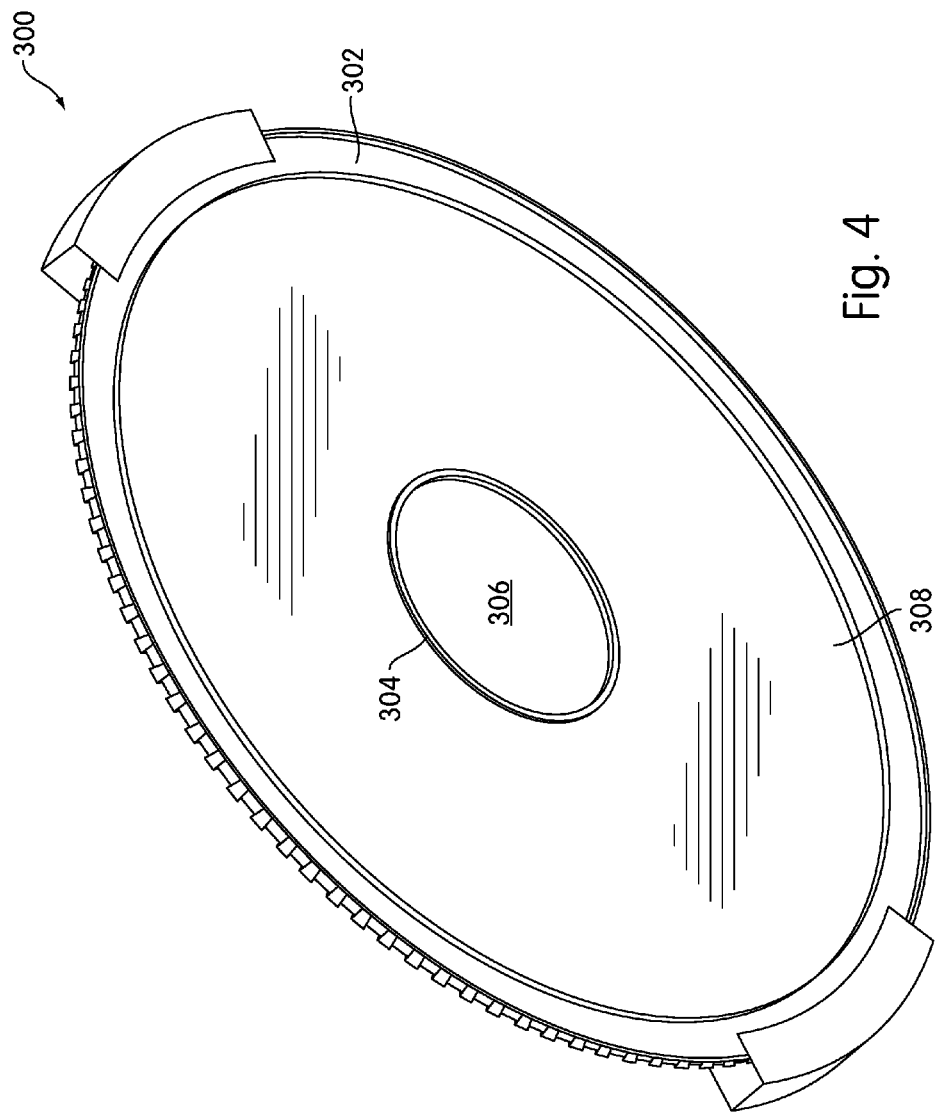
FIG. 4 is a perspective view of another embodiment of a rotor of an axial gap direct drive generator, illustrating a solid disk configuration.

Of course, the rotor 32 and stator 38 need not have spokes and could instead comprise solid disks. FIG. 4 is a perspective view of another embodiment of a rotor 300 of a direct drive generator. In the rotor 300, the perimeter 302 is connected to a central ring 304 that defines an opening 306 by a solid portion 308. In some embodiments, the solid portion 308 may have openings or open areas.

Because the rotor 32 is carried by the hub 22, the mechanical energy of the blades 24 can be transferred directly to the generator 10. This is in contrast to other possible embodiments where, for example, the blades 24 and hub 22 drive a shaft, and the generator may be installed elsewhere on that shaft.

Figure 5:
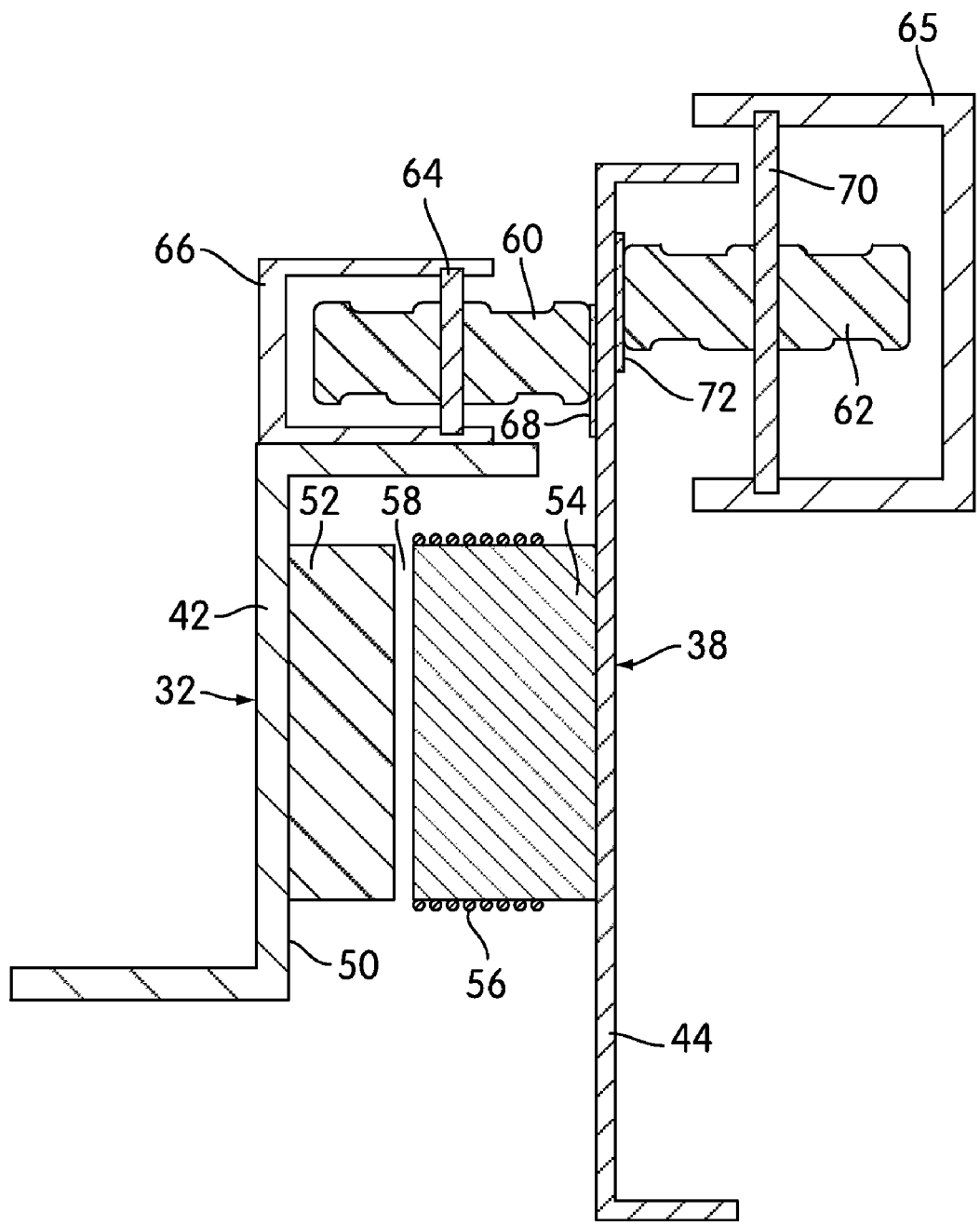
FIG. 5 is a cross-sectional view of the perimeter of the axial gap direct drive generator of FIG. 1, illustrating its gap-maintaining rolling supports.

FIG. 5 is a sectional view of the perimeters of a rotor and a stator according to one embodiment of the invention. It should be understood that the rotor and stator depicted in FIG. 5 are slightly different than the rotor and stator depicted in FIGS. 2 and 3, insofar as the generator 10 illustrated in FIGS. 2 and 3 has a rotor with a perimeter or peripheral portion that fully extends around and encloses the perimeter or peripheral portion of the stator. Those kinds of embodiments will be described below with respect to FIGS. 7 and 8. However, for the sake of convenience in description, FIGS. 5 and 6 use the same reference numerals used in FIGS. 2 and 3 to identify the rotor 32, the stator 38, and certain of their components.

In the embodiment of FIG. 5, the perimeter or peripheral portion 42 of the rotor 32 comprises a Z-channel. On an inner face 50 of the Z-channel, mounted on a back iron (not shown), the rotor 32 includes a plurality of magnetic elements 52, each evenly spaced from one another, and each positioned facing the stator 38. The perimeter or peripheral portion 44 of the stator 38, which is positioned in close proximity to the rotor 32, comprises a C-channel in the illustrated embodiment. Typically, the rotor 32 and stator 38 would be made of a metal, such as steel. The stator 38 carries a plurality of stator teeth 54 on a back iron (not shown), evenly spaced around its perimeter, arranged facing the rotor 32. Each stator tooth 54 has windings/coils 56 either wound around each tooth or wound around several teeth in distributed fashion with each coil extending approximately a magnetic pole pitch in the circumferential direction. An air gap 58 is maintained between the magnetic elements 52 of the rotor 32 and the stator teeth 54 of the stator 38. As will be described in more detail, with the arrangement shown in FIG. 5, the air gap 58 extends in the axial direction, and for this reason, is referred to in this description as an "axial air gap."

The magnetic elements 52 and stator teeth 54 may be arranged in any conventional pattern relative to one another, and they may be wired electrically in any conventional fashion. For example, they may be in an A-B-C pattern with three stator teeth 54 for each pole-pair of magnets. The rotor 32 and stator 38 may or may not be electrically divided into two or more segments. For example, in one embodiment, the direct drive generator 10 may be divided into four segments, with 122 magnetic poles per segment and a total of 488 magnetic poles. An advantage of multi-segment generators is that if one segment is malfunctioning, the generator may still generate electricity using the unaffected segments. The generator 10 as a whole may generate 5-10 MW and run at 690 V, although higher voltages of 1.38 kV, 2.4 kV, 3.3 kV or 4.6 kV may be used. Any other known or compatible electrical configurations may also be used.

In most embodiments, the air gap 58 would be on the order of a few millimeters, such as 5-10 mm, while the overall generator 10 would have a diameter on the order of 3 to 15 m. In order to maintain the air gap 58, the generator 10 includes gap-maintaining elements, which in this case are sets of rolling supports 60, 62 that bear between the rotor 32 and the stator 38, as well as between the stator 38 and an external channel 64 that rotates with the hub 22.

In the illustrated embodiment, these sets of rolling supports 60, 62 are trains of wheels that are arranged around the perimeters 42, 44 of the rotor 32 and stator 38 along with the magnetic elements 52 and the stator teeth 54. As shown in FIG. 5, the first set of rolling supports 60 are mounted on respective axles 64 for rotation within a bracket 66 provided at the top of the rotor 32, above (i.e., radially outward of) the air gap 58. As mounted, the first set of rolling supports 60 bears against a race or track 68 provided along the inward face of the stator 38.

The second set of rolling supports 62 is also mounted for rotation on an axle 70 within a bracket 65 that is mounted to the hub 22 and extended only for the width of the hub 22, bear against a race or track 72 that lies on the opposite face of the stator 38. Thus, in the embodiment of FIG. 5, both sets of rolling supports 60, 62 are positioned above (i.e., radially outward of) the air gap 58.

In particularly advantageous embodiments of the invention, the sets of rolling supports 60, 62 and the tracks 68, 72 against which they bear, and any other structures prone to wear, may be made of a non-magnetic material, such as stainless steel. If those structures are made of stainless steel or other non-magnetic materials, any shavings or particles that may be created by wear will not be attracted to and attach to the magnets. The individual support wheels 60, 62 may be on the order of 100-200 mm in diameter.

Although not shown in FIG. 5, the rotor 32 and stator 38 may also include seals to seal and isolate the magnetic components from the other components and to prevent them from being fouled by debris and environmental conditions. In some embodiments, the seal may be pressure-tight and conditioned air or another gas may be pumped into the sealed area.

Figure 6:
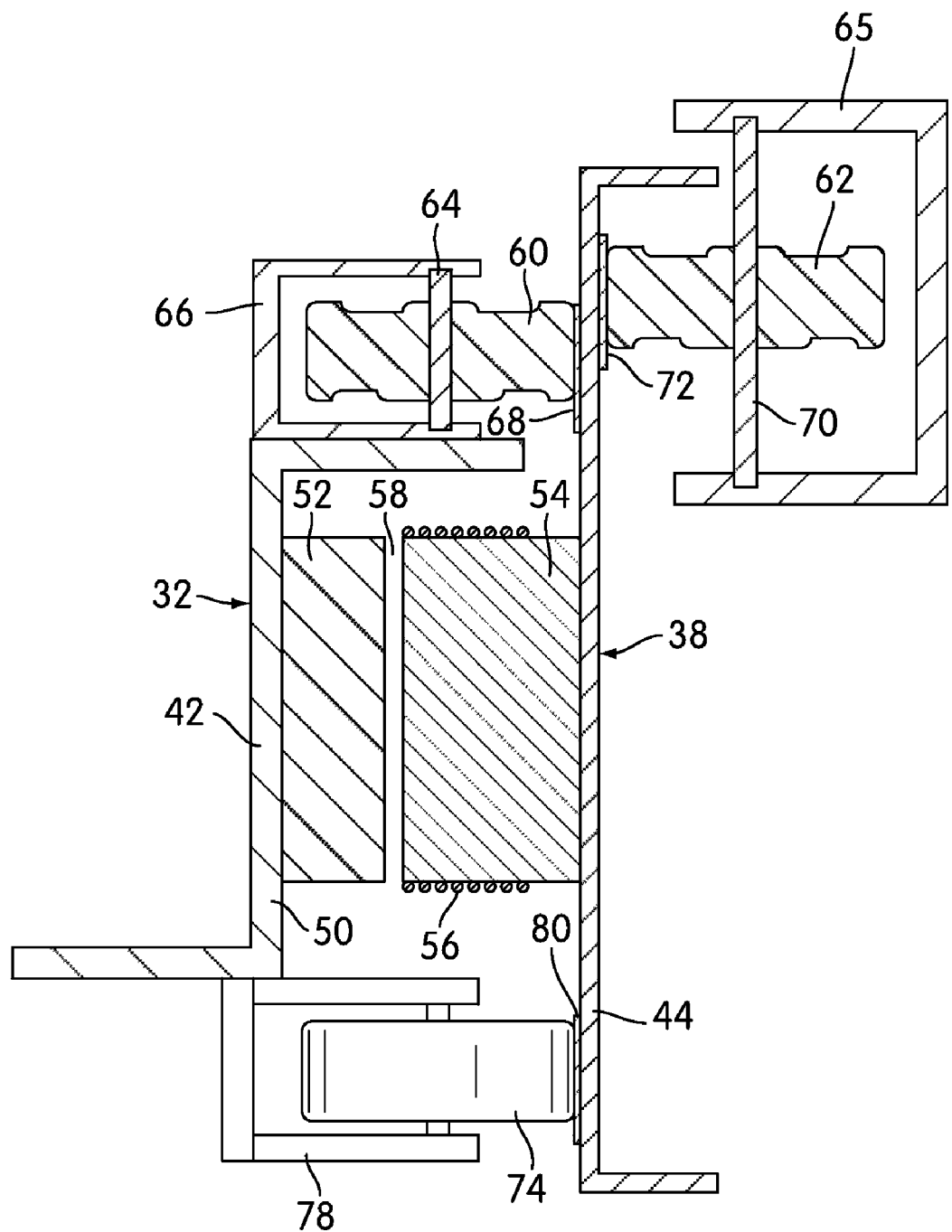
FIG. 6 is a cross-sectional view similar to the view of FIG. 5, illustrating another embodiment of an axial gap direct drive generator with two sets of gap-maintaining rolling supports.
Figure 7:
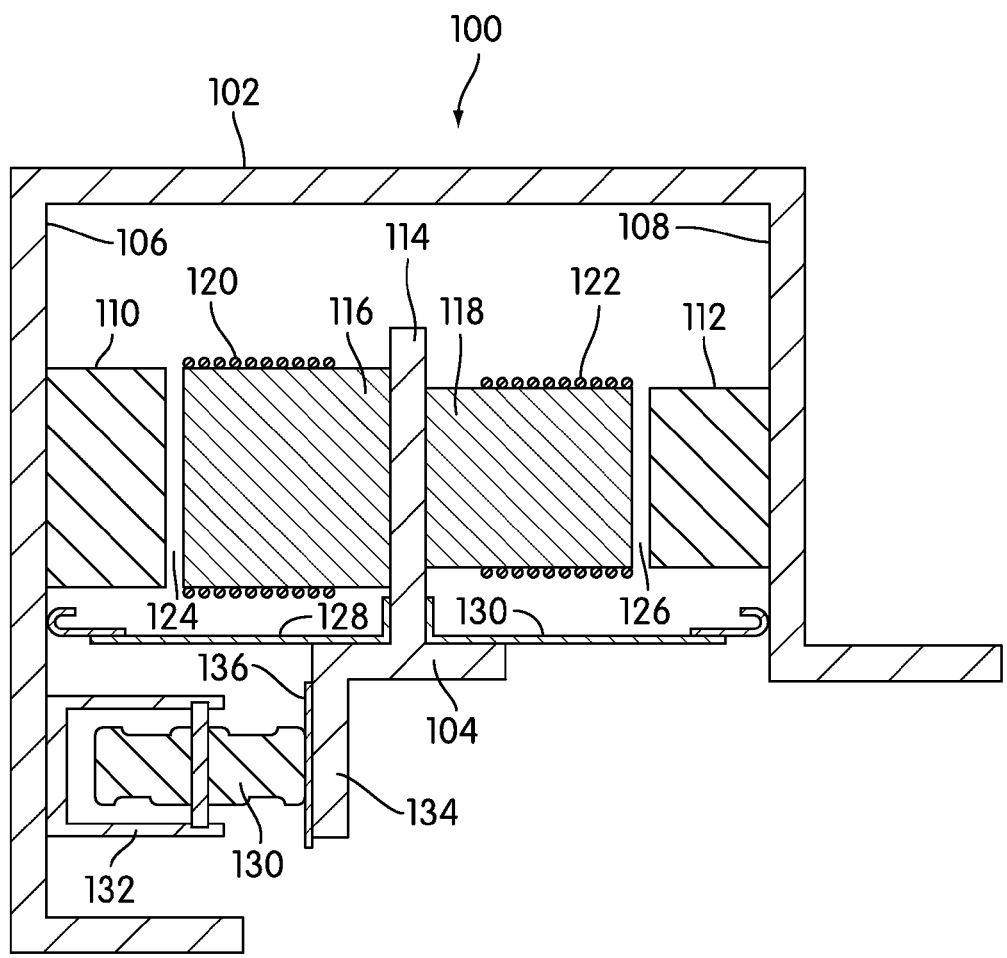
FIG. 7 is a cross-sectional view of the arrangement of yet another embodiment of an axial gap direct drive generator that includes two axial air gaps and a single set of gap-maintaining rolling supports.
Figure 8:
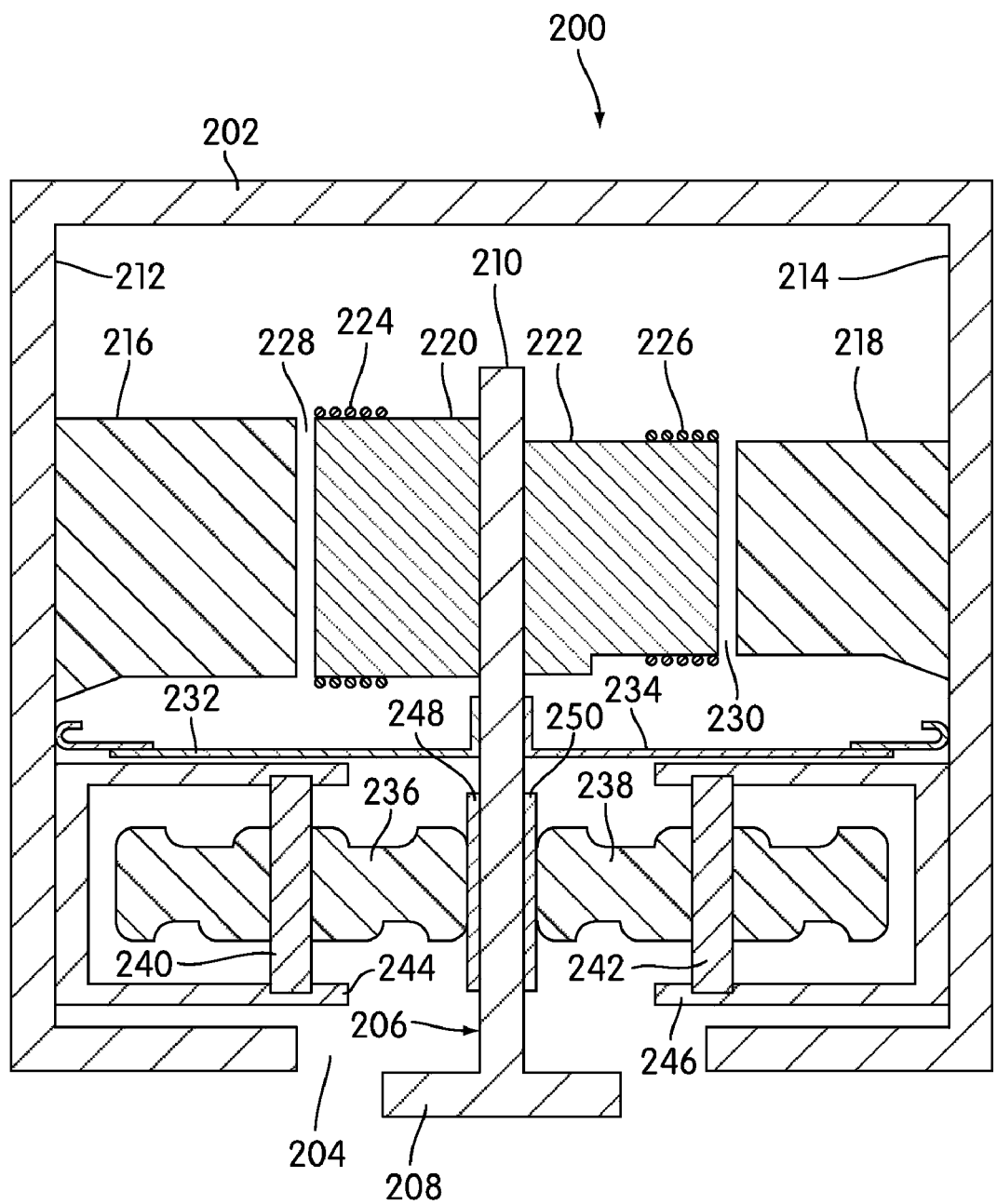
FIG. 8 is a cross-sectional view of the arrangement of yet another embodiment of an axial gap direct drive generator, taken through Line 8-8 of FIG. 3, that includes two axial air gaps and two sets of gap-maintaining rolling supports.

FIGS. 6-8 illustrate a number of embodiments that are variations on the basic concepts illustrated in FIG. 5. FIG. 6 is a cross-sectional view similar to the view of FIG. 5, illustrating another embodiment of the invention. As was described above, in FIG. 5, the sets of rolling supports 60, 62 are positioned above (i.e., radially outward of) the air gap 58. In the embodiment of FIG. 6, a set of rolling supports 74 is mounted within a bracket 78 attached to a lower portion of the Z-channel that defines the perimeter 42 of the rotor 32, such that the set of rolling supports 74 is below (i.e., radially inward of) the air gap 58. As shown, the lower set of rolling supports 74 bears against a track 80 provided on the inward face of the stator 38.

The lower set of rolling supports 74 may be offset in angular position from the other rolling supports 60, 62. In the view of FIG. 6, one of the rolling supports 74 and its bracket 78 are seen in elevation, rather than cross-section, because they are behind the plane through which the cross-section of FIG. 6 is taken.

As those of skill in the art will appreciate, the magnetic forces between the rotor 32 and stator 38 may approach several tons of attractive force per meter of the generator perimeter. Therefore, in order to balance the forces and reduce the overall mechanical stresses on the rotor 32 and stator 38, a second air gap may be provided, axially opposite the location of the first air gap.

FIG. 7 is a cross-sectional view similar to the views of FIGS. 5-6 illustrating a generator 100 that includes two air gaps. More particularly, the generator 100 includes a rotor 102 that, along its outer radial edge, forms a channel that extends around and over the top of the stator 104, thus enclosing the stator 104 on three sides. The left and right inwardly-facing sides 106, 108 of the rotor 102 carry respective sets of magnetic elements 110, 112. The stator 104 has a central, radially-extending portion 114. Each face of the radially-extending portion 114 carries a set of stator teeth 116, 118 and associated windings/coils 120, 122. Thus, the generator 100 of FIG. 5 includes two air gaps 124, 126, one air gap 124, 126 between each pair of magnetic elements 110, 112 and stator teeth 116, 118.

The two opposing sets of magnetic elements 110, 112 and stator teeth 116, 118 serve to balance the mechanical forces on the rotor 102 and stator 104. In some embodiments, the sets of magnetic elements 110, 112 and stator teeth 116, 118 may be sized so as to produce equal amounts of axially directed force. However, it is advantageous to maintain at least some degree of attractive force bias to ensure the rotating supports 130 are engaged on the track 136 between the rotor 102 and the stator 104; therefore, in the embodiment of FIG. 7, one pair of magnetic elements 112 and stator teeth 118 is radially smaller than the other 110, 116. This may be, for example, a 55%/45% split.

Below the respective air gaps 124, 126, a pair of seals 128, 130 extending between the inward walls 106, 108 of the rotor 102 and the stator 104 seals the compartment created by the rotor 102, thus isolating the electrical generating structure from other components. Below the sealed compartment, a single set of rotating supports 130 is mounted on corresponding sets of brackets to bear between the inner face 106 of the rotor 102 and a radially inwardly projecting portion 134 of the stator 104. A track 136 is provided on the face of the stator portion 134 against which the set of rotating supports 130 bear.

FIG. 8 is a cross-sectional view of another embodiment of an axial gap direct drive generator, generally indicated at 200. In the embodiment of FIG. 8, the perimeter of the rotor 202 forms a generally square or rectangular tube, extending around all four sides. An opening 204 admits the perimeter of the stator 206. In the illustrated embodiment, the perimeter of the stator 206 has the general shape of an inverted "T." An axial portion 208 serves to connect to the spokes or disk that connect the perimeter of the stator 206 to its center support. A radially-extending portion 210 connects to and extends from the axial portion 208.

The left and right inwardly-facing sides 212, 214 of the rotor 202 carry respective sets of magnetic elements 216, 218. The magnetic elements 216, 218 face the radially-extending portion 210 of the stator 206. The radially-extending portion 210 of the stator 206 carries stator teeth and backiron 220, 222 with associated windings 224, 226 that face the magnetic elements 216, 218, thereby defining two air gaps 228, 230. The magnetic elements 216 and corresponding stator teeth 220 are radially larger than the pair of magnetic elements and stator teeth 218, 222 on the other side of the stator 206, thus embodying the 55%/45% split explained above. However, in other embodiments, the pairs of magnetic elements 216, 218 and stator teeth and backiron 220, 222 may be of the same size so as to generate the same amount of magnetic force.

Below the magnetic elements 216, 218 and the stator teeth 220, 222, a pair of seals 232, 234 provides isolation for the electrical and magnetic elements of the generator. Below the seals 232, 234, arranged symmetrically to bear between the left and right inwardly-facing sides 212, 214 of the rotor 202 and the respective faces of the radially-extending portion 210 of the stator 206 are two sets of rotating elements 236, 238. Each of the rotating elements 236, 238 is mounted on an axle 240, 242 that is held by a bracket 244, 246, and each bears against a track 248, 250 on a face of the radially-extending portion 210 of the stator 206.

In embodiments in which seals 128, 130, 232, 234 are used to isolate the magnetic components, the sets of rotating elements 130, 236, 238 may not need to be made of a non-ferromagnetic material such as stainless steel. Instead, any material that can resist corrosion and/or other operating conditions may be used. It should be understood that most, if not all, embodiments would have some sort of sealing structure, although for the sake of simplicity, seals are not shown in the views of FIGS. 5 and 6.

In the above description, the gap-maintaining rolling supports are sets or trains of wheels. However, in other embodiments, rotational bearings of various sorts may be used instead of wheels. More broadly, any element that can bear between the rotor and the stator to maintain the axial air gap without undue wear may be used in embodiments of the invention.

Axial gap direct drive generators 10, 100, 200 according to embodiments of the invention may be used in wind turbines 12 and in other applications. As was noted briefly above, when used in various applications, the generators 10, 100, 200 may be mounted in various ways. The mounting of the generator 10 described above with respect to FIGS. 1 and 2 allows the hub 22 to transmit both torque and axial loads to the generator 10.

Figure 9:
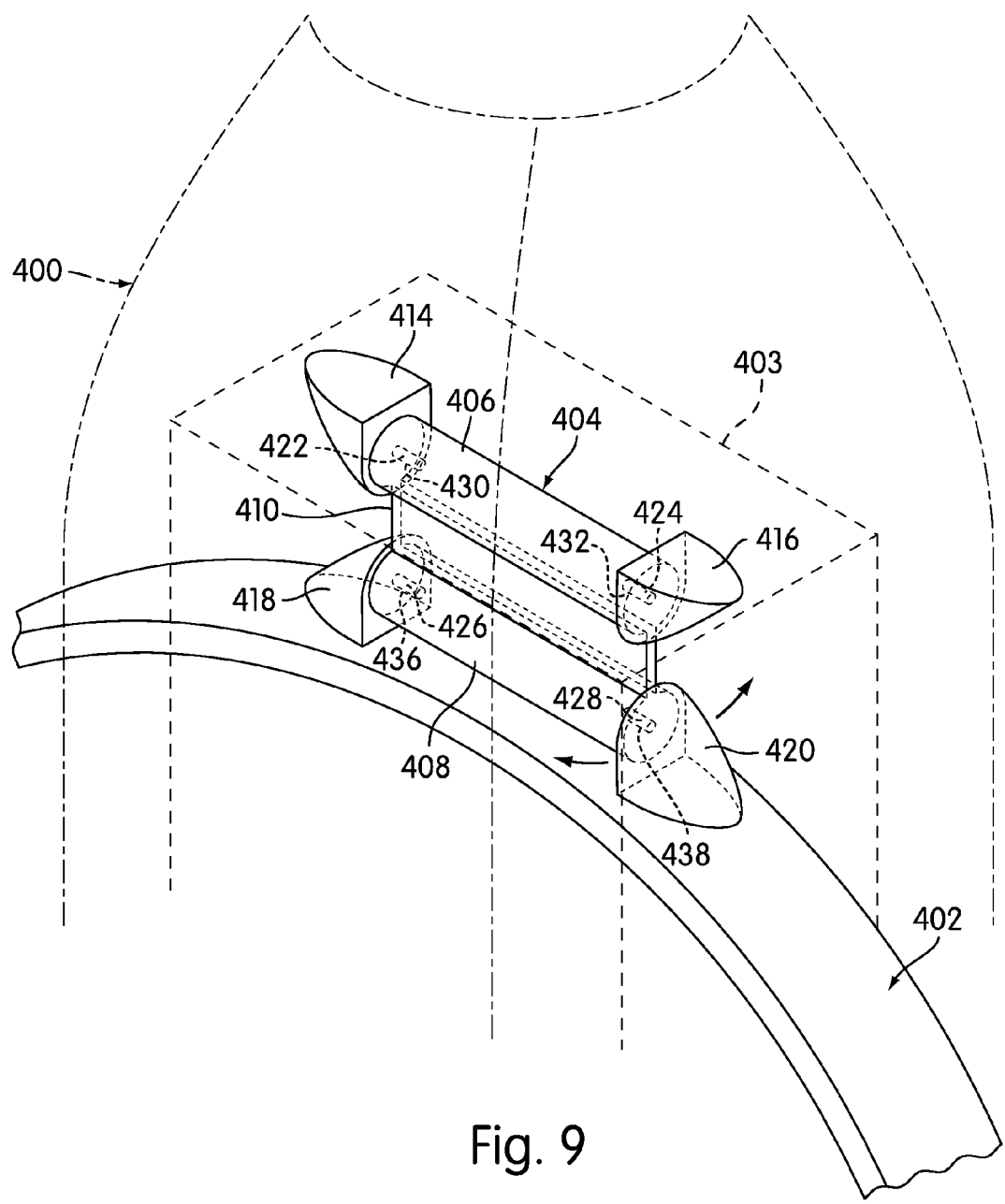
FIG. 9 is a perspective view of another embodiment of a joint between a hub and a rotor.

However, transmitting axial loads to the generator 10, 100, 200 may not be advantageous. Therefore, in some embodiments, generators 10, 100, 200 may be mounted using mechanisms that transmit torque but not axial loads. FIG. 9 is a perspective view of a portion of a hub 400 with a portion of a generator 402. The hub 400 has an elongate central slot 403 in which a hinging connector 404 is mounted. In some embodiments, the hinging connector 404 may be mounted to a channel connected to the slot 403; in other embodiments, the hinging connector 404 may be secured directly to the slot 403.

The hinging connector 404 has a rounded cylindrical upper portion 406, a rounded cylindrical lower portion 408, and a web or strip of material 410 between the upper and lower portions 406, 408. The upper and lower portions 406, 408 each have a pair of endcaps 414, 416, 418, 420 that attach to the generator 402 and the hub 400, respectively. The endcaps 414, 416, 418, 420 also mount the upper and lower portions 406, 408 for rotation, by means of axle portions 422, 424, 426, 428 that extend from the respective endcaps 414, 416, 418, 420 into corresponding openings 430, 432, 436, 438 provided within the ends of the upper and lower portions 406, 408. Thus installed, the hinging connector 404 can rotate about both of its upper and lower portions 406, 408, providing for movement in the axial direction, but can still transmit torques. Typically, a second hinging connector 404 would be installed at the bottom of the hub 400 as well.

During operation, the hub 400 of a wind turbine may deflect or move on the order of an inch (2.54 cm) or more in the axial direction as wind on the blades creates axial loads. However, the presence of the hinging connector 404 allows the hub 400 to move in the axial direction, as indicated by the arrows in FIG. 9, so that the loads are not transferred to the generator 402.

As was described briefly above, although generators 10, 100, 200 according to embodiments of the invention may be used in essentially any application, they may be particularly suited for sea-based applications or other applications in which accelerations and changes in angular position are likely. That is because the gap-maintaining rolling supports, and the arrangement of the axial air gap or gaps in general, make the generators 10, 100, 200 more robust, in that they are less sensitive to accelerations and changes in position. For example, although the embodiments illustrated and described above show the generators 10, 100, 200 being used in a vertical orientation, generators 10, 100, 200 according to embodiments of the invention could be used vertically, horizontally, or at any angular position between vertical and horizontal. For those reasons, generators 10, 100, 200 according to embodiments of the invention are particularly suitable for use with floating underwater support structures 14 that allow some degree of acceleration and changes in angular position.

Although the above description focused on a direct drive electrical generator with an axial air gap and gap-maintaining rolling supports, as those of ordinary skill in the art will understand, a motor may also be made according to embodiments of the invention.

While the invention has been described with respect to certain embodiments, those embodiments are intended to be exemplary, rather than limiting. Modifications and changes may be made within the scope of the invention, which is defined by the following claims.

What is claimed is:

1. A support mechanism for controlling the air gap of a rotating electrical machine, comprising:
   a rotatable rotor ring and a stator ring placed in proximity to one another in association with a shaft so as to define an axial air gap between the rotor ring and the stator ring; and
   one or more sets of rolling gap supports bearing between the rotor ring and the stator ring along the periphery of the rotor ring and the stator ring in the direction of the axial air gap;
   wherein the one or more sets of rolling gap supports comprise one or more sets of wheels.

2. The support mechanism of claim 1, wherein the rotating electrical machine comprises a direct drive generator.

3. The support mechanism of claim 1, wherein the stator ring is fixed to the shaft and the rotor ring is mounted for rotation about the shaft.

4. The support mechanism of claim 1, wherein the support mechanism comprises two sets of rolling gap supports, one set of rolling gap supports arranged to bear against a first side face of the stator ring, and the other set of rolling gap supports arranged to bear against a second side face of the stator ring.

5. The support mechanism of claim 1, wherein the support mechanism comprises two or more sets of rolling gap supports, at least one first set of rolling gap supports constructed and arranged to bear between the rotor ring and the stator ring radially outward of the air gap and at least one second set of rolling gap supports constructed and arranged to bear between the rotor ring and the stator ring radially inward of the air gap.

6. The support mechanism of claim 1, wherein the rotor ring is carried and driven by a hub of a wind turbine.

7. The support mechanism of claim 1, wherein the rotor and stator rings have diameters of at least about three meters and the axial air gap has a width of about 5-10 millimeters.

8. A generator assembly, comprising:
   a shaft;
   a stator ring fixed to the shaft; and
   a hub constructed and adapted to rotate about the shaft, the hub having a rotor ring carried by the hub for rotation in association with the shaft and in proximity to the stator ring;
   wherein the rotor ring is not connected to the shaft; and
   wherein the hub further comprises one or more blades connected thereto and extending therefrom, the blades being arranged to be driven by the wind so as to drive the hub to rotate about the shaft.

9. The generator assembly of claim 8, wherein the hub further comprises an elongate central opening, and the rotor ring is mounted within the elongate central opening of the hub.

10. The generator assembly of claim 8, further comprising a hinging connector mounted between the hub and the rotor ring, the hinging connector having
    a first end mounted for rotation within the elongate central opening,
    a second end mounted for rotation on the rotor ring, and
    a connecting portion extending between the first and second ends,
    the arrangement of the hinging connector being such that torques are transmitted between the hub and the rotor ring while axial loads are attenuated.

11. The generator assembly of claim 8, wherein the hub is mounted on the shaft.

12. The generator assembly of claim 8, wherein the rotor ring forms an axial air gap relative to the stator ring.

13. The generator assembly of claim 12, further comprising one or more sets of rolling gap supports bearing between the rotor ring and the stator ring along the periphery of the rotor ring and the stator ring in the direction of the axial air gap.

14. A generator comprising:
    a rotor ring having a peripheral channel with at least left and right sidewalls, interior faces of the left and right sidewalls carrying respective first and second sets of magnetic elements;
    a stator ring with a peripheral portion that is sized and adapted to be at least partially received in the peripheral channel of the rotor ring between the left and right sidewalls, the peripheral portion of the stator ring having respective left and right faces, the left and right faces carrying respective first and second sets of stator teeth, each of the stator teeth having windings or coils, the rotor ring being constructed and arranged to rotate relative to the stator ring, the positioning of the stator ring relative to the rotor ring establishing first and second axial air gaps between the first and second sets of magnetic elements and the first and second sets of stator teeth; and
    one or more sets of rolling gap supports bearing between the peripheral channel of the rotor ring and the peripheral portion of the stator ring so as to maintain the first and second axial air gaps.

15. The generator of claim 14, further comprising two sets of rolling gap supports, a first set of rolling gap supports bearing between the left face of the peripheral channel and the left face of the peripheral portion, and a second set of rolling gap supports bearing between the right face of the peripheral channel and the right face of the peripheral portion.

16. The generator of claim 14, further comprising a hub mounted for rotation on the shaft, the hub having one or more blades connected thereto, the blades being arranged to be driven by wind to rotate the hub about the shaft;
   wherein the rotor ring is carried by the hub for rotation relative to the shaft.

17. The generator of claim 16, wherein the rotor ring does not contact the shaft.

18. The generator of claim 14, wherein magnetic forces across one of the first and second axial air gaps are greater than magnetic forces across the other of the first and second axial air gaps.

19. A support mechanism for controlling the air gap of a rotating electrical machine, comprising:
   a rotatable rotor ring and a stator ring placed in proximity to one another in association with a shaft so as to define an axial air gap between the rotor ring and the stator ring; and
   one or more sets of rolling gap supports bearing between the rotor ring and the stator ring along the periphery of the rotor ring and the stator ring in the direction of the axial air gap;
   wherein the support mechanism comprises two sets of rolling gap supports, one set of rolling gap supports arranged to bear against a first side face of the stator ring, and the other set of rolling gap supports arranged to bear against a second side face of the stator ring.

20. A support mechanism for controlling the air gap of a rotating electrical machine, comprising:
   a rotatable rotor ring and a stator ring placed in proximity to one another in association with a shaft so as to define an axial air gap between the rotor ring and the stator ring; and
   one or more sets of rolling gap supports bearing between the rotor ring and the stator ring along the periphery of the rotor ring and the stator ring in the direction of the axial air gap;
   wherein the support mechanism comprises two or more sets of rolling gap supports, at least one first set of rolling gap supports constructed and arranged to bear between the rotor ring and the stator ring radially outward of the air gap and at least one second set of rolling gap supports constructed and arranged to bear between the rotor ring and the stator ring radially inward of the air gap.

21. A support mechanism for controlling the air gap of a rotating electrical machine, comprising:
   a rotatable rotor ring and a stator ring placed in proximity to one another in association with a shaft so as to define an axial air gap between the rotor ring and the stator ring; and
   one or more sets of rolling gap supports bearing between the rotor ring and the stator ring along the periphery of the rotor ring and the stator ring in the direction of the axial air gap;
   wherein the rotor and stator rings have diameters of at least about three meters and the axial air gap has a width of about 5-10 millimeters.

22. A generator assembly, comprising:
   a shaft;
   a stator ring fixed to the shaft; and
   a hub constructed and adapted to rotate about the shaft, the hub having a rotor ring carried by the hub for rotation in association with the shaft and in proximity to the stator ring;
   wherein the rotor ring is not connected to the shaft; and
   a hinging connector mounted between the hub and the rotor ring, the hinging connector having
      a first end mounted for rotation within the elongate central opening,
      a second end mounted for rotation on the rotor ring, and
      a connecting portion extending between the first and second ends,
   the arrangement of the hinging connector being such that torques are transmitted between the hub and the rotor ring while axial loads are attenuated.

23. A generator assembly, comprising:
   a shaft;
   a stator ring fixed to the shaft; and
   a hub constructed and adapted to rotate about the shaft, the hub having a rotor ring carried by the hub for rotation in association with the shaft and in proximity to the stator ring;
   wherein the rotor ring is not connected to the shaft; and
   wherein the rotor ring forms an axial air gap relative to the stator ring.

24. The generator assembly of claim 23, further comprising one or more sets of rolling gap supports bearing between the rotor ring and the stator ring along the periphery of the rotor ring and the stator ring in the direction of the axial air gap.

* * * * *